United States Patent [19]

Komuro

[11] Patent Number: 4,757,246

[45] Date of Patent: Jul. 12, 1988

[54] STEP MOTOR DRIVE CIRCUIT

[75] Inventor: Shintaro Komuro, Tokyo, Japan

[73] Assignee: NEC Corporation, Japan

[21] Appl. No.: 883,996

[22] Filed: Jul. 10, 1986

[30] Foreign Application Priority Data

Jul. 12, 1985 [JP] Japan .................. 60-153816

[51] Int. Cl.[4] .............................. H02P 8/00
[52] U.S. Cl. .................. 318/696; 318/685; 318/567
[58] Field of Search .............. 318/696, 685, 567

[56] References Cited

U.S. PATENT DOCUMENTS 4,107,593 8/1978 Anderson .................. 318/685
4,600,868 7/1986 Bryant .................. 318/567

Primary Examiner—William M. Shoop, Jr.
Assistant Examiner—Saul M. Bergmann
Attorney, Agent, or Firm—Ostrolenk, Faber, Gerb & Soffen

[57] ABSTRACT

A drive circuit for a step motor having a multi-phase winding arrangement comprises means for generating a control signal which represents a fixed value during acceleration and deceleration periods of the step motor and functions as repetition pulses during a constant speed period thereof, switch means responsive to the control signal from the control signal generator means, power supply means responsive to an on-off operation of the switch means to deliver a drive current to respective phase windings of the step motor, and comparator means for comparing an actual current flowing through each of said phase windings with a reference value to deliver an output indicative of a compared result to the switch means.

9 Claims, 3 Drawing Sheets

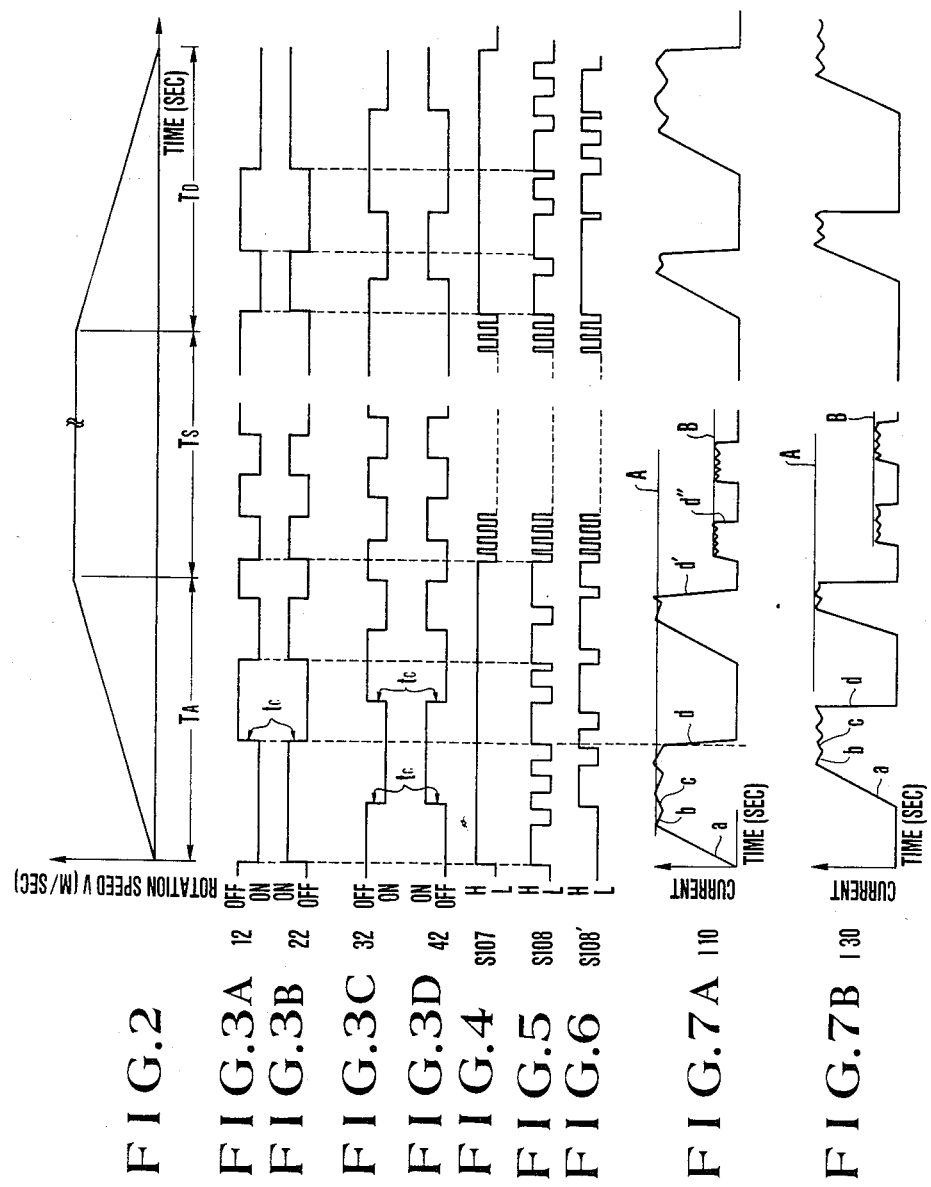

4,757,246

STEP MOTOR DRIVE CIRCUIT

BACKGROUND OF THE INVENTION

The present invention relates to a step motor drive circuit.

Ordinarily, carriage feed step motors for use in serial printers have three modes of acceleration operation, constant speed operation and deceleration speed operation which are cyclically repeated wherein printing operation is carried out in the mode of constant speed operation.

In general, the modes of acceleration and deceleration operations require a large torque (current) proportional to inertia of load (carriage) as compared to the mode of constant speed operation. Further, it is required for realizing stable start and stop to control the step motor so that the value of a current is kept constant. In addition, even in the mode of the constant speed operation, various kinds of speeds are required in conformity with printing systems or methods employed and it is desirable for providing an optimum printed result to vary a winding current of the step motor in accordance with respective speeds so that its response is substantially equal to the critical response.

In the prior art, drive and control for such step motors has been carried out on the basis of a constant current self-excitation chopper system to detect a winding current of the motor to control an actual winding current by the feedback of the winding current detected, or a separate-excitation chopper system wherein the above-mentioned feedback control is not conducted and a method is instead employed to create a chopper signal to effect a chopper control using the chopper signal.

However, drawback with these conventional systems is as follows. With the self-excitation chopper system, a threshold level for chopping is set in dependence upon a winding current. Accordingly, in the modes of acceleration and deceleration operations and in the mode of constant speed operation, when an attempt is made to vary chopping threshold level to change the winding current, the circuit configuration becomes complicated, with the result that such a system is not practically acceptable. To eliminate this inconvenience, when a control is effected with the chopping threshold level being set at a constant value (e.g. torque at the time of acceleration or deceleration), this torque becomes an excessive drive torque in the mode of the constant speed operation, giving rise to the problem that vibration of the motor occurs, the motor is unnecessarily heated or the like.

SUMMARY OF THE INVENTION

An object of the present invention is to provide a step motor drive circuit which has eliminated the drawbacks with the prior arts, and which can ensure a stabilized and smooth revolution free from vibration or heating etc. over an entire speed range with a simplified circuit configuration.

To achieve this object, the present invention provides a drive circuit for a step motor having a multi-phase winding arrangement comprising: means for generating a control signal which has a constant voltage level during acceleration and deceleration periods of the step motor and a series of pulses during a constant speed period thereof; switch means responsive to the control signal from the control signal generator means; power supply means responsive to an on-off operation of the switch means to deliver a drive current to respective phase windings of the step motor; and comparator means for comparing an actual current flowing through each phase winding with a reference value to deliver an output indicative of a compared result to the switch means.

BRIEF DESCRIPTION OF THE DRAWINGS

FIG. 2 is a view showing the relationship between time and rotation speed of a step motor, FIGS. 3A to 3D are timing charts showing on-off operations of phase transistors shown in FIG. 1, respectively, FIG. 4 a waveform of a control signal in the embodiment shown in FIG. 1, FIGS. 5 and 6 show waveforms of outputs of respective comparators, and FIGS. 7A and 7B show waveforms of currents flowing through a phase winding shown in FIG. 1.

DETAILED DESCRIPTION OF A PREFERRED EMBODIMENT

The present invention will be described in detail with reference to attached drawings.

Figure 1:
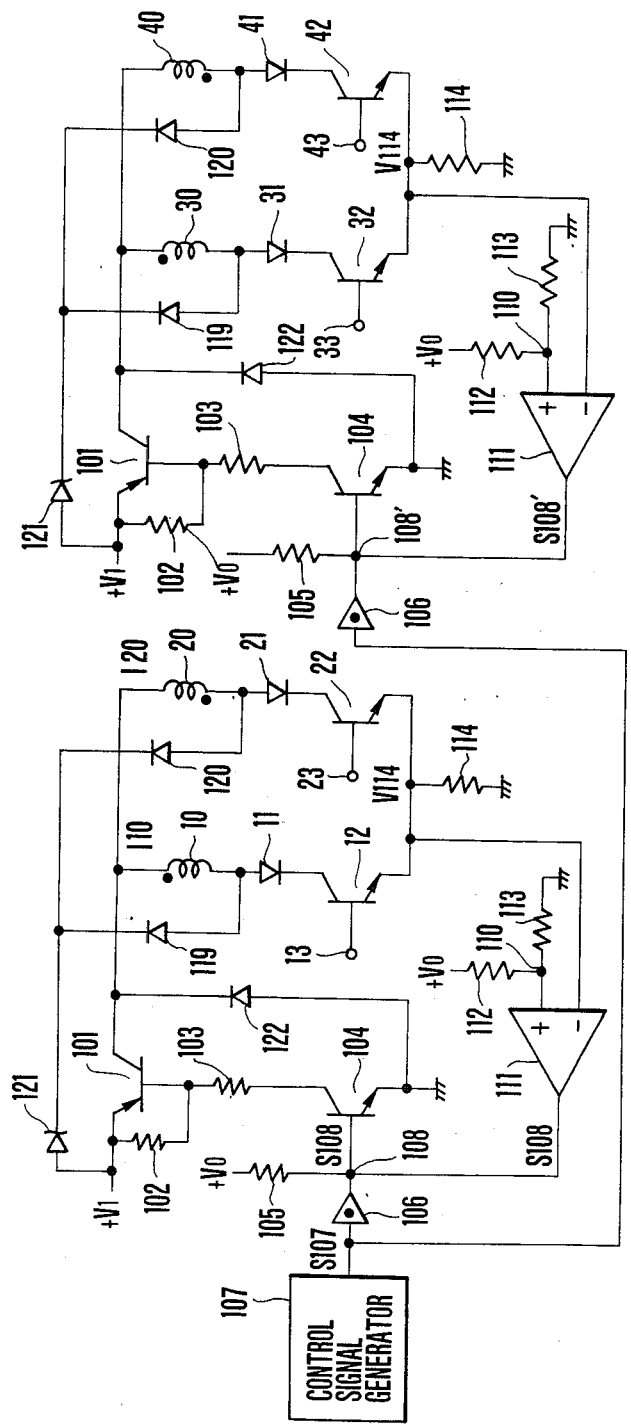
FIG. 1 is a circuit diagram illustrating an embodiment of a step motor drive circuit according to the present invention.

FIG. 1 is a circuit diagram illustrating an embodiment of a step motor drive circuit according to the present invention. As seen from this figure, one ends of phase windings 10, 20, 30 and 40 are connected to collectors of corresponding phase transistors 12, 22, 32 and 42 through diodes 11, 21, 31 and 41, respectively. The other ends of the respective phase windings are connected to collectors of voltage control transistors 101. The phase transistors 12, 22, 32 and 42 are turned on or off in response to control signals delivered to their bases 13, 23, 33 and 43, respectively. These phase transistors effect switching operation in a manner that curents flow through either of the phase windings 10 and 20 through either of the phase windings 30 and 40.

A control signal generator 107 delivers a control signal S107 to the step motor drive circuit according to this embodiment. In FIG. 1, circuits on the right and left sides connected to the control signal generator 107 have the same construction in regard to the control of the phase windings 10 and 20 and the phase windings 30 and 40. Accordingly, only the circuit (on the left side) related to the phase windings 10 and 20 will be described.

As shown, a junction of the phase winding 10 and the diode 11 and a junction of the phase winding 20 and the diode 21 are connected to one end of a Zener diode 121 through respective flyback diodes 119 and 120. The other end of the Zener diode 121 is connected to a power supply $+V_1$.

Emitters of the phase transistors 12 and 22 are grounded through a resistor 114 for current detection and also connected to an inverting input terminal $(-)$ of a comparator 111. To a non-inverting input terminal $(+)$ of the comparator 111, a voltage obtained by voltage-dividing a power supply voltage $V_0$ by resistors 112 and 113 is delivered as a reference voltage.

The control signal generator 107 is provided with an output terminal connected to an input terminal of an IC 106 of the open collector type. Output terminals of the open collector IC 106 and the above-mentioned comparator 111 are connected by a wired OR 108. To the wired OR 108, the power supply voltage $V_0$ is connected through a pull-up resistor 105. In addition, an output signal of the wired OR 108 is delivered to a base of a transistor 104. The transistor 104 has a collector connected to a base of the voltage control transistor 101 through a resistor 103, and an emitter connected to ground and to the collector of the voltage control transistor 101 i.e. respective one ends of the phase windings 10 and 20 through a flyback diode 122.

The voltage control transistor 101 has an emitter connected to its base through a resistor 102 and also connected to the power supply $+V_1$ and to the other end of the Zener diode 121.

The circuit on the right side in FIG. 1 i.e. the circuit related to the phase windings 30 and 40 has the same circuit configuration as stated above and circuit components represented by the same reference numerals as those in the circuit on the left hand have the same functions, respectively.

The operation of the step motor drive circuit shown in FIG. 1 will be described. FIG. 2 is a view showing the relationship of a rotation speed of the step motor versus time wherein $T_A$, $T_S$ and $T_D$ represent acceleration, constant speed and deceleration periods, respectively.

FIGS. 3A, 3B, 3C and 3D are time charts showing on-off operations of the transistors 12, 22, 32 and 42, respectively. FIG. 4 shows a waveform of the control signal S107. FIGS. 5 and 6 show waveforms of output signals S108 and S108' of the comparators 111 on the left and right sides in FIG. 1, respectively. FIGS. 7A and 7B show waveforms of currents I10 and I30 flowing through the phase windings 10 and 20, respectively. The above-mentioned FIGS. 2, 3A to 3D, 4, 5, 6, 7A and 7B are all represented by using the same time axes, respectively.

In high speed serial printers in which a step motor is used, a method is hardly employed to use the motor within a self-starting frequency range, because this method allows the motor to be large. Ordinarily, a method is employed to set three periods of acceleration, constant speed and deceleration to gradually increase a speed from the stopped state during the acceleration period to shift to the constant speed operation when a required speed is reached to gradually decrease a speed when the operation enters the deceleration period to stop the motor. During the acceleration and deceleration periods, because a large load torque is required, it is necessary to drive the step motor using a large current. On the contrary, during the constant speed period, it is possible to efficiently drive the step motor by using a small current.

Since the phase windings 10 and 20 and 30 and 40 of the step motor are driven with antiphase relationship, only the control of the phase windings 10 and 30 will be described.

During the acceleration and deceleration periods, the control signal S107 is fixed at high level. At this time, the transistor 104 is turned on and the voltage control transistor 101 is also turned on. Thus, the power supply voltage $+V_1$ is applied to the phase windings 10, 20, 30 and 40. When the phase transistor 12 is turned on, a current labeled a of the current I10 shown in FIG. 7A flows through the phase winding 10. By the current a, a terminal voltage V114 of the current detection resistor 114 linearly rises. This terminal voltage V114 is compared with the reference voltage of the comparator 111 of the open collector type. When the terminal voltage is above the reference voltage, the output signal S108 of the comparator 111 shifts to low (L) level (the comparator 111 is turned on). As a result, the transistor 104 is cut off, thus allowing the voltage control transistor 101 to be cut off. When the voltage control transistor 101 is turned off, a current based on an energy of the phase windings 10 and 30 which are energized flows through the phase windings 10 and 30 and the current detection resistor 114 via the flyback diode 122. This current appears as a current labeled b in the waveforms of the phase winding currents I10 and I30 shown in FIGS. 7A and 7B. As a result, the terminal voltage V114 across the current detection resistor 114 drops. When this terminal voltage V114 is lower than the reference voltage of the comparator 111, the output S108 of the comparator 111 shifts to H level (off). As a result, as previously described, the voltage transistor 101 is turned on, thus allowing a current labeled c to flow through the phase windings 10 and 30 for a second time. Thus, for a time period during which the control signal 107 is maintained at high (H) level, the currents I10 and I30 flowing the respective phase windings 10 and 30 are subjected to chopper control by a self-excitation constant current chopper circuit including the comparator 111 and the respective phase winding currents have waveforms as indicated by A. The same control as that in regard to the phase windings 10 and 30 is applied to other phase windings 20 and 40 after phase is switched in the rotational control of the step motor.

During the constant speed period, the control signal S107 is delivered as a chopper signal having fixed pulse width and frequency. By this chopper signal, currents flowing through the phase windings 10, 20, 30 and 40 undergo an on-off control. Accordingly, current as indicated by B determined by the pulse width and the frequency of the chopper flow through the respective phase windings. At this time, the terminal voltage V114 across the current detection resistor 114 is sufficiently lower than the reference voltage. Accordingly, the output of the comparator 111 has a H state and the control signal S107 is applied to the base of the transistor 104 as the signal S108. As stated above, during the constant speed period, the phase winding currents are controlled by the constant pulse chopper signal of the control signal S107. The control signal S107 is delivered as a signal of H level during the acceleration and deceleration periods and as a signal having fixed pulse width and frequency corresponding to a drive speed of the step motor during the constant speed period.

Figure 8:
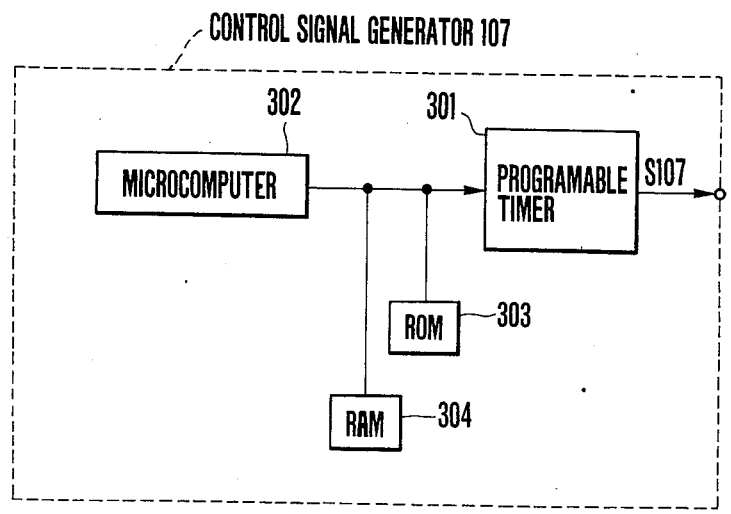

FIG. 8 shows an example of the control signal generator 107. The control signal generator 107 comprises a programmable timer 301, a microcomputer 302, a read only memory (ROM) 303, and a random access memory (RAM) 304. In accordance with an instruction from the microcomputer 302, data indicative of an arbitrary constant pulse value (pulse width and frequency) written into the ROM 303 is set to the timer 301 to create the control signal S107 corresponding to a speed during to constant speed period. In this instance, the RAM 304 operates as a work area for carrying out these processings. The timer 301 is controlled by the microcomputer 302 so that its output voltage is fixed at H level during the acceleration and deceleration periods. At the time of phase switching labeled $t_c$ of the step motor shown in FIGS. 3A to 3D, an electromagnetic energy accumulated or stored in the phase windings 10, 20, 30 and 40 and an counter-electromotive force produced due to the revolution of motor are discharged to the power supply +V$_1$ through the flyback diodes 119 and 120. The Zener diode 121 functions to rapidly take out the energy accumulated in the phase winding from the phase windings to improve a response speed at the time of the revolution of the step motor. Namely, the Zener diode 121 prescribes sharpness of falling d of a current at the time of phase switching.

The resistor 102 connected between the base and the emitter of the transistor 101 functions to increase the turn off speed of the voltage control transistor 101. The diodes connected in series with the phase transistors 12, 22, 32 and 42 functions to prevent an electromagnetic induction current produced between the phase windings 10 and 20 and the phase windings 30 and 40 from flowing from the emitter to the collector of each of phase transistors 12, 22, 32 and 42 in an opposite direction to disturb response speed of the step motor.

As described in detail, the step motor drive circuit according to the present invention is operated on the basis of both the constant current self-excitation chopper system and the separate-excitation chopper system having a programmable pulse width. Accordingly, during the acceleration and deceleration periods, the drive circuit is operated as the self-excitation chopper to effect the constant current chopper drive corresponding to a set value, thus making it possible to realize a stable and surge-free drive. On the other hand, during the constant speed period, since the pulse width can be changed in accordance with the drive speed, the setting of the optimum load response can be made in accordance with various operation speeds. Thus, by making use of the both drive systems, a stable and high efficient driving of the step motor is possible. In addition, even when there occurs an abnormal condition in the separate-excitation chopper circuit, i.e., an increase of the pulse width or a continuous on-state, the self-excitation chopper prevents an overcurrent from continuously flowing through the windings, thus making it possible to protect the windings.

What is claimed is:

1. A drive circuit for a step motor having a multi-phase winding arrangement comprising:
    means for generating a control signal having a constant voltage level during acceleration and deceleration periods of said step motor and a series of pulses during a constant speed period thereof,
    switch means responsive to said control signal from said control signal generator means,
    power supply means responsive to an on-off operation of said switch means to deliver a drive current to respective phase windings of said step motor, and
    comparator means for comparing an actual current flowing through each of said phase windings with a reference value to deliver an output indicative of a compared result to said switch means.

2. A drive circuit for a step motor as in claim 1, wherein said multi-phase winding arrangement includes a plurality of groups of phase windings, every phase windings of the same group being energized in the same phase.

3. A drive circuit for a step motor as in claim 2, wherein said multi-phase winding arrangement comprises a respective pair of phase transistors for each of said plurality of groups of phase windings.

4. A drive circuit for a step motor as in claim 3, wherein said respective pair of phase transistors effect a switching operation that causes said drive current to flow through either one of said phase windings of the same group.

5. A drive circuit as in claim 3, wherein each of said pair of phase transistors is connected in series with one of said phase windings through a respective diode.

6. A drive circuit as set forth in claim 5, wherein flyback diodes are respectively connected between junctions of said phase transistors and said phase windings and a power supply voltage terminal through a Zener diode.

7. A drive circuit for a step motor as in claim 2, wherein said power supply means is provided with a respective voltage control transistor and said switch means is provided with a respective switching transistor coupled to said voltage control transistor for each of said plurality of groups of said phase windings, said voltage control transistor being controlled by said switching transistor and said switching transistor being responsive to a logical sum output of said control signal generator means and an output of said comparator means.

8. A drive circuit for a step motor as set forth in claim 7, wherein a flyback diode is connected between an output side of said voltage control transistor and a ground side of said switching transistor.

9. A drive circuit for a step motor as in claim 1, wherein said control signal generator means comprises a microcomputer, a read only memory in which data indicative of constant values defining said series of pulses are stored, a programmable timer to which data indicative of an arbitrary constant value is set in response to an instruction from said microcomputer to create said series of pulses of the control signal corresponding to a speed during said constant speed period, and a random access memory providing a work area instrumental for creating said control signal.

* * * * *